United States Patent
Isoda et al.

(10) Patent No.: US 7,375,160 B2
(45) Date of Patent: May 20, 2008

(54) RUBBER-REINFORCED VINYL RESIN, PROCESS FOR PRODUCING RUBBER-REINFORCED VINYL RESIN, AND RUBBER-REINFORCED VINYL RESIN COMPOSITION

(75) Inventors: Shinji Isoda, Tokyo (JP); Hironari Muraki, Tokyo (JP); Tadashi Nagahara, Tokyo (JP); Hiromi Tomono, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 316 days.

(21) Appl. No.: 10/529,578

(22) PCT Filed: Sep. 29, 2003

(86) PCT No.: PCT/JP03/12404

§ 371 (c)(1),
(2), (4) Date: Mar. 30, 2005

(87) PCT Pub. No.: WO2004/029114

PCT Pub. Date: Apr. 8, 2004

(65) Prior Publication Data

US 2006/0014899 A1 Jan. 19, 2006

(30) Foreign Application Priority Data

Sep. 30, 2002 (JP) ............................. 2002-284662
Sep. 19, 2003 (JP) ............................. 2003-328464

(51) Int. Cl.
*C08F 279/02* (2006.01)
*C08F 255/06* (2006.01)

(52) U.S. Cl. ...................... 525/191; 525/193; 525/237; 525/240; 525/241

(58) Field of Classification Search ................ 525/191, 525/240, 237, 193, 241
See application file for complete search history.

(56) References Cited

U.S. PATENT DOCUMENTS

| 5,677,382 | A | * | 10/1997 | Tsuji et al. | ................. 525/237 |
| 6,251,998 | B1 | * | 6/2001 | Medsker et al. | ............ 525/192 |
| 6,403,716 | B1 | * | 6/2002 | Nishihara | ................... 525/191 |
| 6,596,812 | B2 | | 7/2003 | Toyoshima et al. | |
| 6,610,787 | B2 | * | 8/2003 | Isoda et al. | ................. 525/240 |

FOREIGN PATENT DOCUMENTS

| JP | 08-31111131 | 11/1996 |
| JP | 11-302338 | 2/1999 |
| JP | 11-302339 | 2/1999 |
| JP | 11-302338 | 11/1999 |
| JP | 2001-214023 | 7/2001 |
| JP | 2001-288354 | 10/2001 |
| JP | 2002-256043 | 9/2002 |
| JP | 2003-002931 | 1/2003 |
| JP | 2003-055525 | 2/2003 |

* cited by examiner

*Primary Examiner*—Randy Gulakowski
(74) *Attorney, Agent, or Firm*—Fitch, Even, Tabin & Flannery

(57) ABSTRACT

A rubber-reinforced vinyl resin which is obtained by polymerizing a vinyl monomer in the presence of a rubber-like copolymer comprising at least two members selected from (I) an ethylene-α-olefin based rubber having a Mooney viscosity of 15 or higher, (II) an ethylene-octene based rubber having a Mooney viscosity less than 15, and (III) an ethylene-octene based rubber having a Mooney viscosity of 15 or higher; a process for producing the resin; and a composition containing the rubber-reinforced vinyl resin. They are excellent in moldability and gives a molded articles which are excellent in appearance in terms of gloss, flow marks, weld appearance, color unevenness at welded portions, colorability and the like, and excellent in impact resistance, for example, impact resistance at low temperatures as well as in weatherability.

7 Claims, No Drawings

RUBBER-REINFORCED VINYL RESIN, PROCESS FOR PRODUCING RUBBER-REINFORCED VINYL RESIN, AND RUBBER-REINFORCED VINYL RESIN COMPOSITION

This Application is the National Phase of International Application No. PCT/JP03/12404 filed Sep. 29, 2003, which designated the U.S. and as not published under PCT Article 21(2) in English, and this application claims, via the aforesaid International Application, the foreign priority benefit of and claims the priority from Japanese Application No. 2003-328464, filed Sep. 19, 2003, and from Japanese Application No. 2002-284662, filed Sep. 30, 2002, the complete disclosures of all the aforesaid applications are incorporated herein by reference.

TECHNICAL FIELD

The present invention relates to a rubber-reinforced vinyl resin which is obtained by polymerizing a vinyl monomer in a presence of at least two different types of ethylene-α-olefin based rubber-like copolymers; a process for producing the resin; and a composition containing the resin. More specifically, the present invention relates to a rubber-reinforced vinyl resin having excellent moldability and giving molded products excellent in appearance in terms of gloss, flow marks, weld appearance, color unevenness at welded portions and colorability, and excellent in impact resistance, in particular, impact resistance at low temperatures and also excellent in weatherability; a process for producing the resin; and a composition containing the resin.

BACKGROUND ART

It has been known that graft copolymers (AES resins) obtained by employing, as a base rubber component, EPM or EPDM that contains substantially no unsaturated bonds in the main chain thereof and by copolymerizing styrene, acrylonitrile or the like with the rubber component, are larger in resistance against ultraviolet light, oxygen and ozone, and markedly higher in weatherability than ABS resins that contain conjugated diene rubbers as the base rubber component. However, molded products conventionally obtained from AES resins are poor in appearance, and are sometimes unsatisfactory in physical properties at low temperatures. Accordingly, various improvements have been made; however, it has been difficult to improve molded products in appearance and low temperature properties better than the conventional levels since propylene is used as α-olefin in the rubber component.

Concurrently, there has been demanded an AES resin which is better in impact resistance than conventional AES resins. For the purpose of increasing the impact resistance, a method is conceivable in which content of the base rubber component in the products is increased, or a method in which molecular weight of rigid resin components (matrix components) is increased. However, the increase of the content of the base rubber component in the products is not preferable, because rigidity of the products is lowered, or appearance of the molded products is deteriorated. Additionally, with the method in which the molecular weight of rigid resin components is increased, fluidity is lowered, or appearance of the molded products is deteriorated. Thus, it has hitherto been difficult to improve the balance between the impact resistance and the other physical properties of products.

Although a method for improving molded products in appearance has been proposed in Japanese Patent Laid-Open (Kokai) No. H11-302339, further improvements are demanded in appearance at welded portions and such defects as flow marks and color unevenness at welded portions.

DISCLOSURE OF THE INVENTION

The present inventors, in view of the above described circumstances, have diligently investigated for the purpose of improving the above described drawbacks, and have perfected the present invention by finding out that when vinyl monomers are polymerized in the presence of at least two different types of ethylene-α-olefin based rubber-like copolymers, moldability is improved, and there can be provided molded articles which are excellent in appearance in terms of gloss, flow marks, weld appearance, color unevenness at welded portions, colorability and the like, and are also excellent in impact resistance, in particular, impact resistance at low temperatures as well as in weatherability.

According to the first aspect of the present invention, there is provided a rubber-reinforced vinyl resin, which is obtained by polymerizing 95 to 20% by weight of a vinyl monomer (B) in a presence of 5 to 80% by weight of a rubber-like copolymer (A) comprising at least two members selected from the below described components (I) to (III), provided that (A)+(B)=100% by weight:

Component (I):
 a rubber-like copolymer which is obtained by polymerizing monomers comprising the mixture of ethylene, an α-olefin having 3 to 20 carbon atoms and a non-conjugated diene at a ratio of 30 to 95/70 to 5/0 to 20 respectively on weight percent basis, wherein the rubber-like copolymer has a Mooney viscosity ($ML_{1+4}$@125° C.) of 15 or higher, excluding the below described the component (III);

Component (II):
 a rubber-like copolymer which is obtained by polymerizing monomers comprising the mixture of ethylene, 1-octene and a non-conjugated diene at a ratio of 50 to 99/50 to 1/0 to 20 respectively on weight percent basis, wherein the rubber-like copolymer has a Mooney viscosity ($ML_{1+4}$@125° C.) of less than 15; and Component (III):
 a rubber-like copolymer which is obtained by polymerizing monomers comprising the mixture of ethylene, 1-octene and a non-conjugated diene at a ratio of 50 to 99/50 to 1/0 to 20 respectively on weight percent basis, wherein the rubber-like copolymer has a Mooney viscosity ($ML_{1+4}$@125° C.) of 15 or higher.

The Mooney viscosity ($ML_{1+4}$@125° C.) of the component (I) is preferably 15 to 40, and more preferably 15 to 30. The Mooney viscosity ($ML_{1+4}$@125° C.) of the component (II) is preferably 0.1 to 15 exclusive of 15, more preferably 0.5 to 12, and particularly preferably 0.5 to 10. The Mooney viscosity ($ML_{1+4}$@125° C.) of the component (III) is preferably 15 to 40, and more preferably 15 to 30.

According to a preferred embodiment of the present invention, the rubber-like copolymer (A) comprises 10 to 90% by weight of the component (I) or (III) and 90 to 10% by weight of the component (II), provided that (I)+(II)=100% by weight or (II)+(III)=100% by weight. In this embodiment, there is provided a rubber-reinforced vinyl resin excellent in appearance of molded articles and colorability. In this embodiment, preferable is a mode in which the rubber-like copolymer (A) comprises the component (I)

and the component (II) in combination, because such a mode provides a rubber-reinforced vinyl resin excellent in impact resistance. Additionally, preferable is a mode in which the rubber-like copolymer (A) comprises the component (III) and the component (II) in combination, because such a mode provides even more excellent appearance of molded articles and colorability.

According to another preferred embodiment of the present invention, the rubber-like copolymer (A) comprises 10 to 90% by weight of the component (I) and 90 to 10% by weight of the component (III), provided that (I)+(III)=100% by weight. This embodiment provides a rubber-reinforced vinyl resin more excellent in the balance between the impact resistance and the appearance of molded articles than a case in which the component (I) or the component (III) is used alone.

Additionally, according to the second aspect of the present invention, there is provided a process for producing a rubber-reinforced vinyl resin, which comprises polymerizing 95 to 20% by weight of a vinyl monomer (B) in a presence of 5 to 80% by weight of a rubber-like copolymer (A) comprising at least two members selected from the above described components (I) to (III), provided that (A)+(B)=100% by weight.

Additionally, according to the third aspect of the present invention, there is provided a rubber-reinforced vinyl resin composition which comprises an above described rubber-reinforced vinyl resin of the present invention and another thermoplastic resin, wherein the rubber-like copolymer (A) constitutes 5 to 70% by weight of the rubber-reinforced vinyl resin composition.

BEST MODE FOR CARRYING OUT THE INVENTION

The present invention will be described below in detail.

In the present invention, the rubber-like copolymer (I) comprises ethylene, an α-olefin and a non-conjugated diene. In the rubber-like copolymer (I), the α-olefin means an α-olefin having 3 to 20 carbon atoms. The α-olefin having the number of carbon atoms of more than 20 is not preferable because it drastically deteriorates in copolymerizability, and hence the resultant resin product provides molded articles extremely poor in surface appearance. A preferable range of the number of carbon atoms in the α-olefin is from 3 to 16, and particularly from 3 to 12. Specific examples of the α-olefin include propylene, 1-butene, 1-pentene, 1-hexene, 4-methyl-1-pentene, 1-heptene, 1-octene, 1-decene, 1-dodecene, 1-hexadecene and 1-eicocene. These α-olefins may be used alone or as an admixture of two or more.

Particularly preferable are copolymers with propylene, 1-butene and 1-octene including an ethylene-propylene rubber, an ethylene-propylene-non-conjugated diene rubber, an ethylene-butene rubber and an ethylene-butene-non-conjugated diene rubber.

The ratio of ethylene to α-olefin is set at 30 to 95/5 to 70 on weight percent basis. Here, it is to be noted that "/" means "per" and also means the same in what follows. When the content of the α-olefin exceeds 70 (% by weight), weatherability, moldability and appearance of molded articles become poor, and when the content of the α-olefin is less than 5 (% by weight), no impact resistance is exhibited because rubber elasticity of the rubber-like copolymer is not sufficient; consequently, neither of these is preferable. Preferably, the ratio of ethylene to α-olefin is 35 to 90/10 to 65 on weight percent basis.

Examples of the non-conjugated diene used for producing the rubber-like copolymer (I) include alkenylnorbornenes, cyclic dienes, and aliphatic dienes; preferable are 5-ethylidene-2-norbornene and dicyclopentadiene. These non-conjugated dienes can be used alone or as an admixture of two or more. Content of the non-conjugated diene in the rubber-like copolymer (I) is 0 to 20% by weight. When the content of the non-conjugated diene exceeds 20% by weight, gelation proceeds, and impact resistance and gloss are degraded. A preferable content range of the non-conjugated diene is 0 to 15% by weight.

The rubber-like copolymer (I) may be either a block copolymer or a random copolymer, or may be a combination of these copolymers as long as it has a rubber structure that exhibits rubbery properties at an ambient temperature.

A rubber-like copolymer that satisfies the predetermined Mooney viscosity ($ML_{1+4}$@125° C.) can be produced by appropriately selecting types and blending ratio of the respective monomer components as well as copolymerization methods.

In the present invention, the rubber-like copolymers (II) and (III) are composed of ethylene, 1-octene and a non-conjugated diene. The ratio of ethylene/1-octene is set at 50 to 99/1 to 50 on weight percent basis. When the content of 1-octene exceeds 50 (% by weight), weatherability, moldability and appearance of molded articles become poor, and when the content of 1-octene is less than 1 (% by weight), no impact resistance is exhibited because rubber elasticity of the rubber-like copolymer is not sufficient; consequently, neither of these is preferable. Preferably, the ratio of ethylene/1-octene is 50 to 90/10 to 50 (% by weight). Additionally, when the ratio of ethylene/1-octene is 75/25 (% by weight) or less, impact resistance is further improved, and when the same ratio is 80/20 (% by weight) or more, moldability is further improved.

Examples of the non-conjugated diene used for producing the rubber-like copolymers (II) and (III) include alkenylnorbornenes, cyclic dienes, and aliphatic dienes; preferable are 5-ethylidene-2-norbornene and dicyclopentadiene. These non-conjugated dienes can be used alone or as an admixture of two or more. Content of the non-conjugated diene in the rubber-like copolymers (II) and (III) are 0 to 20% by weight. When the content of the non-conjugated diene exceeds 20% by weight, gelation proceeds, and impact resistance and gloss are degraded. A preferable content range of the non-conjugated diene is 0 to 15% by weight.

The rubber-like copolymers (II) and (III) may be either a block copolymer or a random copolymer, or may be a combination of these copolymers as long as long as it has a rubber structure that exhibits rubbery properties at an ambient temperature.

A rubber-like copolymer that satisfies the predetermined Mooney viscosity ($ML_{1+4}$@125° C.) can be produced by appropriately selecting types and blending ratio of the respective monomer components as well as copolymerization methods.

When the rubber-like copolymers (I) and (II) are used in combination, blending ratio of these two copolymers are as follows: in relation to the total amount of the components (I) and (II), the component (I) is preferably 90 to 10% by weight (in other words, the component (II) is 10 to 90% by weight), more preferably the component (I) is 88 to 12% by weight (in other words, the component (II) is 12 to 88% by weight), and particularly preferably the component (I) is 85 to 15% by weight (in other words, the component (II) is 15 to 85% by weight). When the blending ratio of the component (I) exceeds 90% by weight (in other words, the blending ratio of the component (II) is less than 10% by weight), appearance is degraded, and when the blending ratio of the component (I) is less than 10% by weight (in other words, the blending ratio of the component (II) exceeds 90% by weight), balance between impact resistance and appearance becomes poor.

When the rubber-like copolymers (III) and (II) are used in combination, the blending ratio of these two copolymers are as follows: in relation to the total amount of the components (III) and (II), the component (III) is preferably 90 to 10% by weight (in other words, the component (II) is 10 to 90% by weight), more preferably the component (III) is 88 to 12% by weight (in other words, the component (II) is 12 to 88% by weight), and particularly preferably the component (III) is 85 to 15% by weight (in other words, the component (II) is 15 to 85% by weight). When the blending ratio of the component (III) exceeds 90% by weight (in other words, the blending ratio of the component (II) is less than 10% by weight), appearance is degraded, and when the blending ratio of the component (III) is less than 10% by weight (in other words, the blending ratio of the component (II) exceeds 90% by weight), balance between impact resistance and appearance becomes poor.

When the rubber-like copolymers (I) and (III) are used in combination, the blending ratio of these two copolymers are as follows: in relation to the total amount of the components (I) and (III), the component (I) is preferably 90 to 10% by weight (in other words, the component (III) is 10 to 90% by weight), more preferably the component (I) is 88 to 12% by weight (in other words, the component (III) is 12 to 88% by weight), and particularly preferably the component (I) is 85 to 15% by weight (in other words, the component (III) is 15 to 85% by weight). When the blending ratio of the component (I) exceeds 90% by weight (in other words, the blending ratio of the component (III) is less than 10% by weight), appearance is degraded, and when the blending ratio of the component (I) is less than 10% by weight (in other words, the blending ratio of the component (III) exceeds 90% by weight), balance between impact resistance and appearance becomes poor.

When the rubber-like copolymers (I), (III) and (II) are used in combination, a preferable blending ratio of the respective components are such that (I)+(III)=10 to 90% by weight and (II)=10 to 90% by weight, provided that (I)+(III)+(II)=100% by weight, and a preferable blending ratio of (I)/(III) is 2 to 98/98 to 2% by weight.

The rubber-reinforced vinyl resin of the present invention is obtained by polymerizing 95 to 20% by weight of a vinyl monomer in a presence of 5 to 80% by weight of the rubber-like copolymer (A), provided that (A)+(B)=100% by weight. When content of the rubber-like copolymer (A) is less than 5% by weight, impact resistance of the rubber-reinforced vinyl resin is insufficient, and when content of the rubber-like copolymer (A) exceeds 80% by weight, surface hardness of molded articles formed of the rubber-reinforced vinyl resin is lowered; consequently, neither of these is preferable. Preferably, the content range of the rubber-like copolymer (A) is from 5 to 60% by weight, and particularly preferably from 10 to 40% by weight.

In the present invention, examples of the vinyl monomer include aromatic vinyls, (meth)acrylates, vinyl cyanides, unsaturated carboxylic acids, and imide compounds of $\alpha,\beta$-unsaturated dicarboxylic acids.

Specific examples of the aromatic vinyl monomers include styrene, $\alpha$-methylstyrene, methylstyrenes, vinylxylenes, monochlorostyrenes, dichlorostyrenes, monobromostyrenes, dibromostyrenes, p-tert-butylstyrene, ethylstyrenes and vinylnaphthalenes; styrene or $\alpha$-methylstyrene is preferable, and styrene is particularly preferable.

Examples of the (meth)acrylates include alkyl acrylates such as methyl acrylate, ethyl acrylate, propylene acrylate, butyl acrylate, amyl acrylate, hexyl acrylate, octyl acrylate, 2-ethylhexyl acrylate and cyclohexyl acrylate; and alkyl methacrylates such as methyl methacrylate, ethyl methacrylate, propylene methacrylate, butyl methacrylate, amyl methacrylate, hexyl methacrylate, octyl methacrylate, 2-ethylhexyl methacrylate and cyclohexyl methacrylate. Particularly, methyl methacrylate is preferable.

Examples of the vinyl cyanides include acrylonitrile and methacrylonitrile; particularly, acrylonitrile is preferable.

As the unsaturated carboxylic acid, there can be used unsaturated acids such as acrylic acid and methacrylic acid; and unsaturated acid anhydrides such as maleic anhydride, itaconic anhydride and citraconic anhydride.

Examples of the imide compounds of $\alpha,\beta$-unsaturated dicarboxylic acids include maleimide; N-alkylmaleimides such as N-methylmaleimide, N-butylmaleimide and N-cyclohexylmaleimide; and N-aromatic maleimides such as N-(p-methylphenyl)maleimide and N-phenylmaleimide. These maleimides can be used in either of the following two ways: one is a way in which imide compounds are used after they have been converted from the corresponding $\alpha,\beta$-unsaturated dicarboxylic acids, and the other is a way in which the corresponding $\alpha,\beta$-unsaturated dicarboxylic acids are copolymerized and then imidized. Among the above maleimides, preferable are N-cyclohexylmaleimide and N-phenylmaleimide.

It is preferable that these vinyl monomers are used in combinations of two or more. Examples of the particularly preferable combinations of the monomers include (1) styrene and acrylonitrile, (2) styrene and methyl methacrylate, and (3) styrene, acrylonitrile and methyl methacrylate Partial or full replacement of the styrene in each of these combinations with $\alpha$-methylstyrene makes it possible to improve heat resistance of the rubber-reinforced vinyl resin. Moreover, when methyl methacrylate is used in the above combinations, the rubber-reinforced vinyl resin is improved in transparency and hence exhibits excellent colorability.

The rubber-reinforced vinyl resin of the present invention can be produced by polymerizing an above described vinyl monomer in the presence of the rubber-like copolymer (A). The production process can be based on conventionally known radical polymerization methods such as solution polymerization method and bulk polymerization method. Additionally, when the rubber-like copolymer (A) is in aggregated forms, the rubber-like copolymer (A) is emulsified or dispersed by using an emulsifying or dispersing apparatus such as various homomixers and homogenizers, and the thus emulsified or dispersed rubber components can be subjected to emulsion polymerization method, emulsion/suspension polymerization method, suspension polymerization method, etc. For the purpose of obtaining a resin product giving molded articles excellent in colorability and excellent in gloss, it is preferable to carry out the production by means of the solution polymerization method or the bulk polymerization method, particularly preferably the solution polymerization method.

Detailed description will be made below on an example in which the rubber-reinforced vinyl resin of the present invention is produced by means of the solution polymerization method. The solution polymerization method uses a solvent. The solvent is an inert solvent used in ordinary radical polymerization, and includes, for example, aromatic hydrocarbons such as ethylbenzene and toluene; ketones such as methyl ethyl ketone and acetone; halogenated hydrocarbons such as dichloromethylene and carbon tetrachloride; and acetonitrile, dimethylformamide and N-methylpyrrolidone. The amount of the solvent to be used is selected within a range from 20 to 200 parts by weight, preferably from 50 to 150 parts by weight, in relation to 100 parts by weight of the sum the rubber-like copolymer (A) and all the monomers.

Polymerization temperature is preferably within a range from 80 to 140° C. although it depends on whether or not a polymerization initiator is used, and when a polymerization initiator is used, it depends on the type and the amount of the polymerization initiator. When the polymerization temperature is lower than 80° C., viscosity of the polymerization system becomes too high in the latter half of polymerization, and hence stable operation is hardly possible, and when the polymerization temperature exceeds 140° C., low molecular weight components resulting from thermal polymerization reaction increase; consequently, neither of these is preferable. Within the above temperature range, preferred is 85 to 130° C., and particularly preferred is 90 to 120° C.

In the above polymerization, a polymerization initiator, a chain transfer agent, an oxidation stabilizer, etc. can be added or mixed. Examples of the polymerization initiator that can be added include organic peroxides such as ketone peroxides, dialkyl peroxides, diacyl peroxides, peroxyesters and hydroperoxides; and examples of the chain transfer agent that can be added include mercaptans, α-methylstyrene dimmer and the like. Additionally, the oxidation stabilizer that can be added include phenolic compounds, phosphorus compounds and the like. Moreover, there can be mixed other additives such as benzotriazole-based or hindered amine-based photostabilizers, and lubricants including stearyl alcohol and ethylene bis(stearamide).

When the rubber-reinforced vinyl resin is produced by means of the solution polymerization method, either batch method or continuous method can be applied. Additionally, no particular constraint is imposed on the method for maintaining the reaction system in a substantially homogeneously mixed condition. Usually, there are adopted stirring and mixing methods using ribbon stirring blades, turbine stirring blades, screw stirring blades, anchor stirring blades, etc., and circulation mixing methods using a pump or the like installed outside the reaction system; combinations of these methods may also be adopted.

Next, as a method for recovering the copolymer from the reaction mixture obtained by the polymerization reaction with the aid of devolatilizing the solvent, the unreacted monomers, etc., there can be selected an appropriate method, according to the adopted polymerization method, for example, a method in which the reaction mixture is suspended and dispersed in water and subjected to steam stripping, a method in which the copolymer solution is preheated and subjected to flushing under reduced pressure, and a method in which the copolymer solution is directly desolvented by means of an extruder equipped with vents or the like.

The rubber-reinforced vinyl resin of the present invention can be made into a rubber-reinforced vinyl resin composition, according to purposes of use, by blending or by melt-kneading the resin with other thermoplastic resins. Examples of such other thermoplastic resins that can be blended include polyethylene, polypropylene, polyvinyl chloride, chlorinated polyethylene, BR, NBR, SBR, S—B—S block copolymer, hydrogenated S—B—S, polystyrene, HIPS, styrene-acrylonitrile copolymer, ABS resin, AES resin, ASA resin, hydrogenated diene polymer rubber-reinforced vinyl resin, polysulfone, polyethersulfone, N-cyclohexylmaleimide copolymer, N-phenylmaleimide copolymer, MBS resin, methyl methacrylate-styrene copolymer, S—I—S block copolymer, polyimide, PPS, polyetheretherketone, polyvinylidene fluoride polymer, polycarbonate, polyacetal, polyamide, polyamide elastomer, polyester elastomer, and PPE resin.

The above exemplified other thermoplastic resins can be used alone or in an admixture of two or more. Among the above exemplified thermoplastic resins, preferable are styrene-acrylonitrile copolymer, ABS resin, AES resin, ASA resin, hydrogenated diene polymer rubber-reinforced vinyl resin, N-cyclohexylmaleimide copolymer, N-phenylmaleimide copolymer, MBS resin, methyl methacrylate-styrene copolymer, polycarbonate, polyamide, and polyamide elastomer.

When the rubber-reinforced vinyl resin of the present invention is blended with other thermoplastic resins, the blending ratio can be optionally selected according to purposes; for the purpose of obtaining satisfactory impact resistance, moldability and transparency, content of the rubber-like copolymer (A) in the rubber-reinforced vinyl resin composition (hereinafter, this content will be referred to as "rubber content") may be selected within a range from 5 to 70% by weight. When the rubber content in the rubber-reinforced vinyl resin composition is less than 5% by weight, impact resistance is insufficient, and when the rubber content exceeds 70% by weight, surface hardness is lowered; consequently, neither of these is preferable. Preferably, the rubber content range is 10 to 65% by weight, and particularly preferably 10 to 40% by weight.

Methods for obtaining the rubber-reinforced vinyl resin composition can be appropriately selected according to forms of the rubber-reinforced vinyl resin of the present invention or forms of other thermoplastic resins. For instance, when the rubber-reinforced vinyl resin is in a form of solution, preferable is a method in which it is mixed with other thermoplastic resins in a form of solution or latex; alternatively, they can be mixed, dry-blended or melt-kneaded together in the following combined forms: latex and latex, powder and powder, powder and pellet, pellet and pellet, etc. Melt-kneading can be conducted by methods in which a Banbury mixer, a kneader, a roll, an extruder or the like is used; particularly preferable is the method in which kneading is conducted using an extruder.

To the rubber-reinforced vinyl resin and the rubber-reinforced vinyl resin composition of the present invention, there can be added or blended various additives usually used for resins, including antioxidants such as hindered phenol antioxidants, phosphorus antioxidants and sulfur antioxidants; photostabilizers; ultraviolet absorbers; lubricants; colorants; fire retardants; auxiliary fire retardants; fillers; and foaming agents.

The rubber-reinforced vinyl resin and the rubber-reinforced vinyl resin composition of the present invention can be subjected to various hitherto known molding processes to obtain target products such as vehicle parts, housings for OA instruments, front frames of TV sets, and parts of various household electric appliances. Examples of the molding processes include injection molding, compression molding and extrusion molding; among these, injection molding is effective because the injection molding provides a high productivity for target products. The conditions under which products are produced by means of the injection molding process are such that molding is conducted at a cylinder temperature of an injection molder of usually 120 to 300° C., preferably 150 to 260° C. and at the mold temperature of 20 to 100° C., preferably 30 to 80° C.

EXAMPLES

The present invention will be described below in more detail on the basis of Examples; however, the present invention is not restricted to the below described Examples provided that the essence of the present invention is not exceeded. It is to be noted that in the below described examples, "parts" and "%" in the text mean "parts by weight" and "% by weight", respectively; and measurement for various physical properties was made on the basis of the following procedures.

(1) Ethylene Content in Ethylene-α-olefin Copolymers:

Ethylene-α-olefin copolymers were analyzed by means of $^1$H-NMR and $^{13}$C-NMR to obtain ethylene-α-olefin composition ratios; and a calibration curve was obtained which showed the relationship between the results of the above NMR analysis and those of the IR analysis that had previously been obtained. On the basis of the calibration curve, there was obtained the composition of each of the ethylene-α-olefin copolymers obtained in the respective Examples.

(2) Mooney Viscosity ($ML_{1+4}$@125° C.):

Measured according to JIS K6300.

(3) MFR:

Melt flow rate (g/10 min) was measured at 220° C. under a load of 10 kg.

(4) Izod Impact Strength (Izod-Imp):

Measured according to ASTM D256 using ¼ inch×½ inch notched test specimens. Unit: [kgf·cm/cm].

(5) Flow Mark

By use of an injection molder with a die clamping compressive force of 120 tons, flat plates of 2.5 mm in thickness, 150 mm in length and 150 mm in width were molded at a molding temperature of 220° C.; and then occurrence of flow marks on the surface of each of the flat plates was evaluated with visual observation. As for the observed results, "○" represents a case in which no flow marks were observed; "X" represents a case in which flow marks were observed all over the surface; and "Δ" represents a case between these two cases.

(6) Surface Gloss:

Measured according to ASTM D523 (θ=45°). Unit: [%].

(7) HDT:

Heat deflection temperature
Measured according to ASTM D648.
(½". 18.6 kg/cm²)
Unit: [° C.].

(8) Falling Weight Impact Strength:

Breaking energy of each of specimens of 80 mm in length, 55 mm in width and 2.5 mm in thickness was measured by use of a high-speed impact tester, Servopulser EHF-2H-20L (manufactured by Shimadzu Co., Ltd.). Measurement conditions were such that the diameter of the specimen pedestal was 43 mmφ, the head of the cylindrical striker was 12.7 mmR, and the striking velocity was 6.7 m/s. Unit: kgf·cm.

Measurement was made at 23° C. and −30° C.

(9) Colorability

Rubber-reinforced vinyl resins were blended according to the below described formulation, and colored pellets were obtained through an extruder. These pellets were further molded to obtain plates for evaluation of color tone, and then chroma of each plate was visually judged.

Coloring Formulation:
Resin: 100 parts;
Cyanine blue: 1.0 part;
Calcium stearate: 0.3 part;
Judgment Criteria:
○: Brilliant
Δ: Between ○ and X
X: Poorly brilliant

(10) Weld Appearance and Color Unevenness at Welded Portions:

By use of the colored pellets used in the above colorability evaluation, the below described molded article with a welded portion generated from molten resins was molded using an injection molder under the conditions that molding temperature was 240° C., die temperature was 50° C., molding cycle time was 60 seconds, and one gate was used.

Molded article: A square molded article of ±0.2 cm in thickness and 15 cm in width with a hole of 1.5 cm in diameter in the center thereof; the welded portion generated from molten resins was formed on the surface around the hole on a side opposite to the gate.

The welded portion was visually evaluated according to the below described judgment criteria.

(a) Weld Appearance:
○: Weld lines (welded portion of molten resins) are scarcely found.
Δ: Weld lines are slightly found.
X: Weld lines are clearly found.

(b) Color Unevenness at Welded Portions (a Phenomenon in which Two Portions Separated by the Welded Portion of Molten Resins are Observed to be Different in Color from Each Other.)
○: Color unevenness is scarcely found.
Δ: Color unevenness is slightly found.
X: Color unevenness is conspicuous.

Example 1

In a stainless steel autoclave having a volume of 20 liters equipped with a ribbon stirring blade, a continuous feeder of an auxiliary agent and a thermometer, 10 parts of a rubber-like copolymer (a-1) shown in Table 1, 10 parts of a rubber-like copolymer (a-4) also shown in Table 1, 56 parts of styrene, 24 parts of acrylonitrile and 100 parts of toluene were placed. The autoclave was heated to an internal temperature of 75° C., and the content of the autoclave was stirred for 1 hour to yield a homogeneous solution. Then, 0.45 part of t-butylperoxyisopropyl carbonate was added thereto, and the internal temperature was further raised up to 100° C. After the temperature reached to 100° C., this temperature was maintained to carry out polymerization reaction with a stirring rotation speed of 100 rpm. After 4 hours passed since the start of the polymerization reaction, the internal temperature was raised up to 120° C., and this temperature was maintained to allow the reaction to proceed further for 2 hours. Then, the reaction was terminated. After the internal temperature was cooled down to 100° C., 0.2 part of octadecyl-3-(3,5-di-t-butyl-4-hydroxyphenol)-propionate and 0.02 part of silicon oil were added, and thereafter the reaction mixture was taken out of the autoclave. The unreacted substances and the solvent were removed by steam distillation, and the volatile matters were substantially evaporated in a 40 mmφ vented extruder at a cylinder temperature of 220° C. under a degree of vacuum of 700 mmHg, to obtain pellets of a rubber-reinforced vinyl resin.

The results of evaluation of various physical properties of the obtained pellets are shown in Table 2.

Examples 2 to 7 and Comparative Examples 1 to 7

Rubber-reinforced vinyl resins were obtained in the same procedures as in Example 1, except that types and amounts of rubber-like copolymers were those given in Tables 2 and 3 in place of those of the case described in Example 1. The results of evaluation of various physical properties of the obtained pellets are shown in Table 2 concerning Examples and in Table 3 concerning Comparative Examples.

Examples 8 and 9

Example 8 employed pellets that were obtained by blending 30 parts of an AS resin of styrene/acrylonitrile=74/26 and [η]=0.30 with 70 parts of the rubber-reinforced vinyl resin obtained in the manner described in Example 1.

Example 9 employed pellets that were obtained by blending 30 parts of an AS resin of styrene/acrylonitrile=74/26 and [η]=0.30 with 70 parts of the rubber-reinforced vinyl resin obtained in the manner described in Example 6.

Various physical properties of the respective pellets of Examples 8 and 9 were evaluated. The evaluation results are shown in Table 4.

Types of Rubber-like Polymers:

In the above described Examples and Comparative Examples, constituent compositions and physical properties of the rubber-like copolymers used for producing the rubber-reinforced vinyl resins were as shown in Table 1.

TABLE 1

| Rubber-like copolymer | Component (I) a-1 | Component (I) a-2 | Component (III) a-3 | Component (II) a-4 | Component (II) a-5 |
|---|---|---|---|---|---|
| <Constituent compositions (%)> | | | | | |
| Ethylene | 50 | 50 | 76 | 82 | 76 |
| Propylene | 45 | 45 | | | |
| Dicyclopentadiene | 5 | | | | |
| 5-Ethylidene-2-norbornene | | 5 | | | |
| 1-Octene | | | 24 | 18 | 24 |
| <Physical properties> | | | | | |
| Mooney viscosity | 23 | 25 | 23 | 2 | 8 |

Notes:
a-1: A rubber-like copolymer polymerized using a Ziegler catalyst.
a-2, 3, 4 and 5: Rubber-like copolymers polymerized using metallocene catalysts.

TABLE 2

| Rubber-reinforced vinyl resin | Example 1 | Example 2 | Example 3 | Example 4 | Example 5 | Example 6 | Example 7 |
|---|---|---|---|---|---|---|---|
| <Polymerization formulations> | | | | | | | |
| Rubber-like copolymer a-1 (component (I)) | 10 | | | 10 | | | 5 |
| Rubber-like copolymer a-2 (component (I)) | | 10 | | | 10 | | |
| Rubber-like copolymer a-3 (component (III)) | | | 10 | | | 10 | 15 |
| Rubber-like copolymer a-4 (component (II)) | 10 | 10 | 10 | | | | |
| Rubber-like copolymer a-5 (component (II)) | | | | 10 | 10 | 10 | |
| Styrene | 56 | 56 | 56 | 56 | 56 | 56 | 56 |
| Acrylonitrile | 24 | 24 | 24 | 24 | 24 | 24 | 24 |
| <Physical properties> | | | | | | | |
| MFR (g/10 min) | 17 | 16 | 16 | 13 | 15 | 14 | 11 |
| HDT (° C.) | 86 | 86 | 88 | 87 | 86 | 87 | 86 |
| Izod-Imp (kgf · cm/cm) | 15 | 17 | 11 | 24 | 26 | 15 | 45 |
| Gloss (%) | 98 | 96 | 99 | 96 | 95 | 97 | 92 |
| Falling weight impact strength (kgf · cm) 23° C. | 230 | 240 | 215 | 345 | 360 | 340 | 350 |
| Falling weight impact strength (kgf · cm) −30° C. | 185 | 190 | 160 | 300 | 335 | 320 | 300 |
| Flow marks | ◯ | ◯ | ◯ | ◯ | ◯ | ◯ | Δ |
| Color unevenness at welded portions | ◯ | ◯ | ◯ | ◯ | ◯ | ◯ | ◯ |
| Weld appearance | ◯ | ◯ | ◯ | ◯ | ◯ | ◯ | Δ |
| Colorability | ◯ | ◯ | ◯ | ◯ | ◯ | ◯ | ◯ |

| Rubber-reinforced vinyl resin | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| <Polymerization formulations> | | | | | | | |
| Rubber-like copolymer a-1 (component (I)) | 20 | | | | | 10 | |
| Rubber-like copolymer a-2 (component (I)) | | 20 | | | | 10 | |
| Rubber-like copolymer a-3 (component (III)) | | | 20 | | | | |
| Rubber-like copolymer a-4 (component (II)) | | | | 20 | | | 10 |

-continued

| Rubber-reinforced vinyl resin | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Rubber-like copolymer a-5 (component (II)) | | | | | 20 | | 10 |
| Styrene | 56 | 56 | 56 | 56 | 56 | 56 | 56 |
| Acrylonitrile | 24 | 24 | 24 | 24 | 24 | 24 | 24 |
| <Physical properties> | | | | | | | |
| MFR (g/10 min) | 11 | 9 | 10 | 23 | 15 | 10 | 21 |
| HDT (° C.) | 86 | 86 | 87 | 89 | 88 | 86 | 88 |
| Izod-Imp (kgf · cm/cm) | 56 | 64 | 41 | 2 | 8 | 62 | 6 |
| Gloss (%) | 84 | 82 | 93 | 99 | 97 | 86 | 88 |
| Falling weight impact strength (kgf · cm) 23° C. | 360 | 380 | 345 | 15 | 320 | 355 | 195 |
| Falling weight impact strength (kgf · cm) −30° C. | 300 | 330 | 275 | 5 | 300 | 305 | 20 |
| Flow marks | X | X | Δ | Δ | Δ | X | Δ |
| Color unevenness at welded portions | Δ | Δ | Δ | X | X | Δ | X |
| Weld appearance | Δ | Δ | X | X | X | Δ | X |
| Colorability | X | X | ○ | ○ | ○ | X | Δ |

TABLE 4

| Rubber-reinforced vinyl resin composition | Example 8 | Example 9 |
|---|---|---|
| <Formulations> | | |
| Rubber-reinforced vinyl resin of Example 1 (parts) | 70 | |
| Rubber-reinforced vinyl resin of Example 6 (parts) | | 70 |
| AS resin (parts) | 30 | 30 |
| <Physical properties> | | |
| MFR (g/10 min) | 20 | 18 |
| HDT (° C.) | 88 | 89 |
| Izod-Imp (kgf · cm/cm) | 16 | 17 |
| Gloss (%) | 99 | 99 |
| Falling weight impact strength (kgf · cm) 23° C. | 190 | 280 |
| Falling weight impact strength (kgf · cm) −30° C. | 155 | 250 |
| Flow marks | ○ | ○ |
| Color unevenness at welded portions | ○ | ○ |
| Weld appearance | ○ | ○ |
| Colorability | ○ | ○ |

(1) Examples 1 to 7 relate to rubber-reinforced vinyl resins which contain two specific types of components in combination as rubber-like copolymers and fall within the scope of the present invention, and they were excellent in appearance of molded articles in terms of flow mark, color unevenness at welded portions, weld appearance, colorability and the like, and were also excellent in fluidity and impact resistance.

(2) Comparative Examples 1 to 3 are examples which do not use the component (II) and fall outside the scope of the present invention, and they were poor in fluidity, appearance of molded articles and the like.

(3) Additionally, Comparative Examples 4 and 5 are examples which use neither the components (I) nor (III) and fall outside the scope of the present invention, and they were poor in impact resistance, appearance of molded articles and the like.

(4) Comparative Example 6 is an example which uses two types of the components (I) in combination as the rubber-like copolymers and fall outside the scope of the present invention, and it was poor in fluidity, appearance of molded articles and the like.

(5) Comparative Example 7 is an example which uses two types of the components (II) in combination as the rubber-like copolymers and fall outside the scope of the present invention, and it was poor in impact resistance, appearance of molded articles and the like.

INDUSTRIAL APPLICABILITY

The present invention relates to a rubber-reinforced vinyl resin which is obtained by polymerizing vinyl monomers in the presence of at least two different types of ethylene-α-olefin based rubber-like copolymers; a process for producing the resin; and a composition containing the resin. The resin has excellent moldability, and gives molded articles excellent in appearance in terms of gloss, flow marks, weld appearance, color unevenness at welded portions, colorability and the like, and excellent in impact resistance, for example, low temperature impact resistance, as well as weatherability. Consequently, the utility value of the present invention is extremely significant.

The invention claimed is:

1. A rubber-reinforced vinyl resin, which is obtained by polymerizing 95 to 20% by weight of a vinyl monomer (B) in a presence of 5 to 80% by weight of a rubber-like copolymer (A) comprising 10 to 90% by weight of the below described component (I) or (III) and 90 to 10% by weight of the below described component (II), provided that (I)+(II)=100% by weight or (II)+(III)=100% by weight, provided that (A)+(B)=100% by weight, wherein Component (I):

a rubber-like copolymer which is obtained by polymerizing monomers comprising the mixture of ethylene, an α-olefin having 3 to 20 carbon atoms and a non-conjugated diene at a ratio of 30 to 95/70 to 5/0 to 20 respectively on weight percent basis, wherein the rubber-like copolymer has a Mooney viscosity ($ML_{1+4}$@125° C.) of 15 or higher, excluding the below described the component (III);

Component (II):

a rubber-like copolymer which is obtained by polymerizing monomers comprising the mixture of ethylene, 1-octene and a non-conjugated diene at a ratio of 50 to 99/50 to 1/0 to 20 respectively on weight percent basis, wherein the rubber-like copolymer has a Mooney viscosity ($ML_{1+4}$@125° C.) of less than 15; and Component (III):

a rubber-like copolymer which is obtained by polymerizing monomers comprising the mixture of ethylene, 1-octene and a non-conjugated diene at a ratio of 50 to 99/50 to 1/0 to 20 respectively on weight percent basis, wherein the rubber-like copolymer has a Mooney viscosity ($ML_{1+4}$@125° C.) of 15 or higher.

2. A rubber-reinforced vinyl resin according to claim 1, in which the rubber-like copolymer (A) comprises 10 to 90% by weight of said component (I) and 90 to 10% by weight of said component (II), provided that (I)+(II)=100% by weight.

3. A rubber-reinforced vinyl resin according to claim 1, in which the rubber-like copolymer (A) comprises 10 to 90% by weight of said component (III) and 90 to 10% by weight of said component (II), provided that (III)+(II)=100% by weight.

4. A process for producing a rubber-reinforced vinyl resin, which comprises polymerizing 95 to 20% by weight of a vinyl monomer (B) in a presence of 5 to 80% by weight of a rubber-like copolymer (A) comprising 10 to 90% by weight of the below described component (I) or (III) and 90 to 10% by weight of the below described component (II), provided that (I)+(II)=100% by weight or (II)+(III)=100% by weight, provided that (A)+(B)=100% by weight:

Component (I):
   a rubber-like copolymer which is obtained by polymerizing monomers comprising the mixture of ethylene, an α-olefin having 3 to 20 carbon atoms and a non-conjugated diene at a ratio of 30 to 95/70 to 5/0 to 20 respectively on weight percent basis, wherein the rubber-like copolymer has a Mooney viscosity ($ML_{1+4}$@125° C.) of 15 or higher, excluding the below described the component (III);

Component (II):
   a rubber-like copolymer which is obtained by polymerizing monomers comprising the mixture of ethylene, 1-octene, and a non-conjugated diene at a ratio of 50 to 99/50 to 1/0 to 20 respectively on weight percent basis, wherein the rubber-like copolymer has a Mooney viscosity ($ML_{1+4}$@125° C.) of less than 15; and Component (III):
   a rubber-like copolymer which is obtained by polymerizing monomers comprising the mixture of ethylene, 1-octene and a non-conjugated diene at a ratio of 50 to 99/50 to 1/0 to 20 respectively on weight percent basis, wherein the rubber-like copolymer has a Mooney viscosity ($ML_{1+4}$@125° C.) of 15 or higher.

5. A process according to claim 4, in which the rubber-like copolymer (A) comprises 10 to 90% by weight of said component (I) and 90 to 10% by weight of said component (II), provided that (I)+(II)=100% by weight.

6. A process according to claim 4, in which the rubber-like copolymer (A) comprises 10 to 90% by weight of said component (III) and 90 to 10% by weight of said component (II), provided that (III)+=100% by weight.

7. A rubber-reinforced vinyl resin composition, which comprises the rubber-reinforced vinyl resin defined in claim 1 and another thermoplastic resin, in which the rubber-like copolymer (A) constitutes 5 to 70% by weight of the rubber-reinforced vinyl resin composition.

* * * * *